May 24, 1960  C. E. ADLER  2,938,126
INDICATOR SCANNING DEVICE
Filed Dec. 16, 1955  6 Sheets-Sheet 1
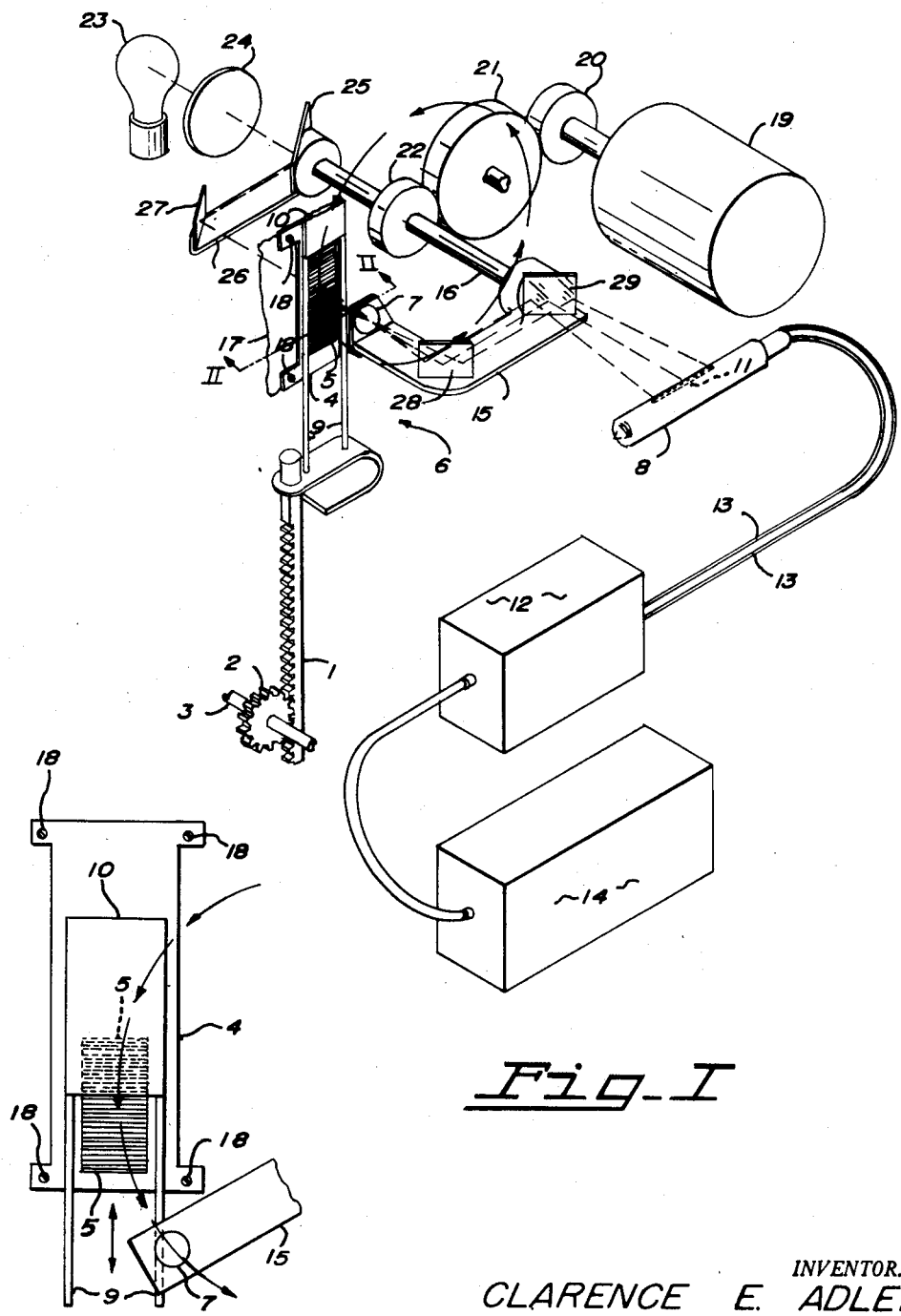
Fig. I
Fig. II
INVENTOR.
CLARENCE E. ADLER
BY
Marshall, Marshall & Heading
ATTORNEYS May 24, 1960 C. E. ADLER 2,938,126
INDICATOR SCANNING DEVICE
Filed Dec. 16, 1955 6 Sheets-Sheet 2
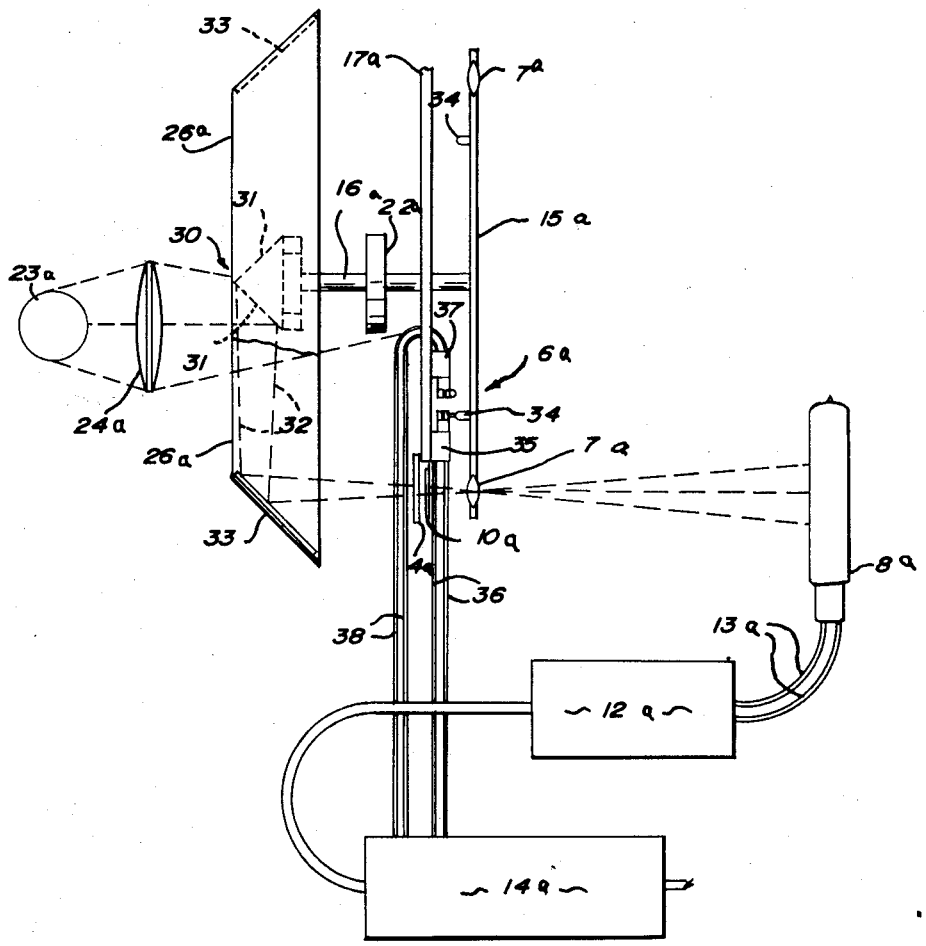
Fig. III
INVENTOR.
CLARENCE E. ADLER
BY
Marshall, Marshall & Justin
ATTORNEYS May 24, 1960
C. E. ADLER
2,938,126
INDICATOR SCANNING DEVICE
Filed Dec. 16, 1955
6 Sheets-Sheet 3
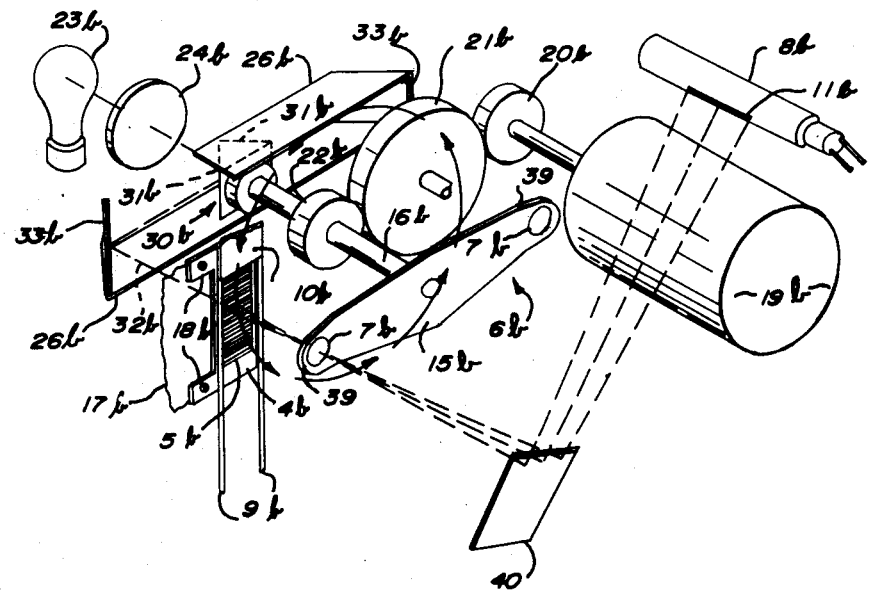
Fig. IV
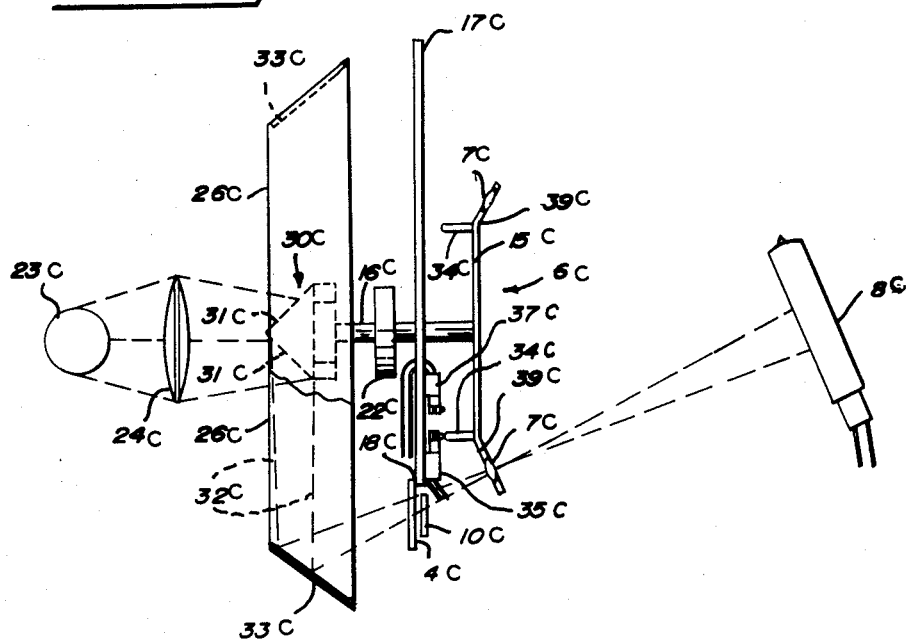
Fig. V
INVENTOR.
CLARENCE E. ADLER
BY
Marshall, Marshall & Hastings
ATTORNEYS

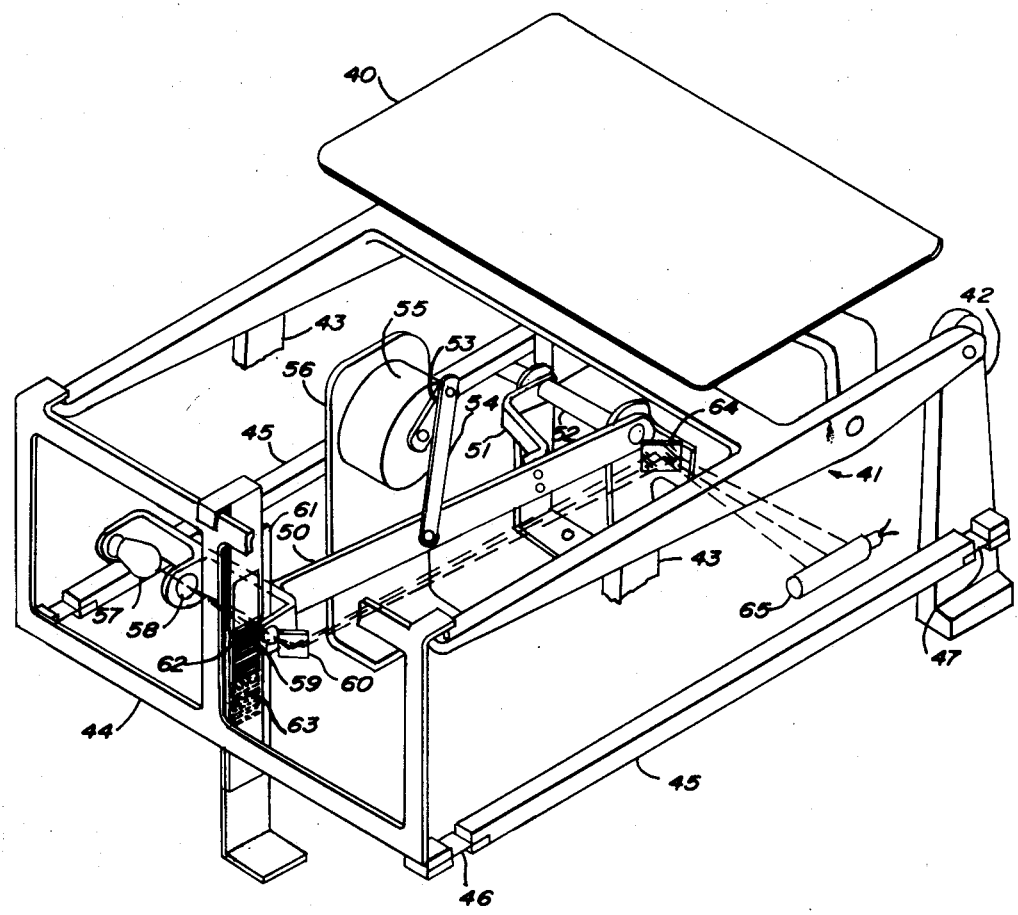
Fig. VI
INVENTOR.
CLARENCE E. ADLER

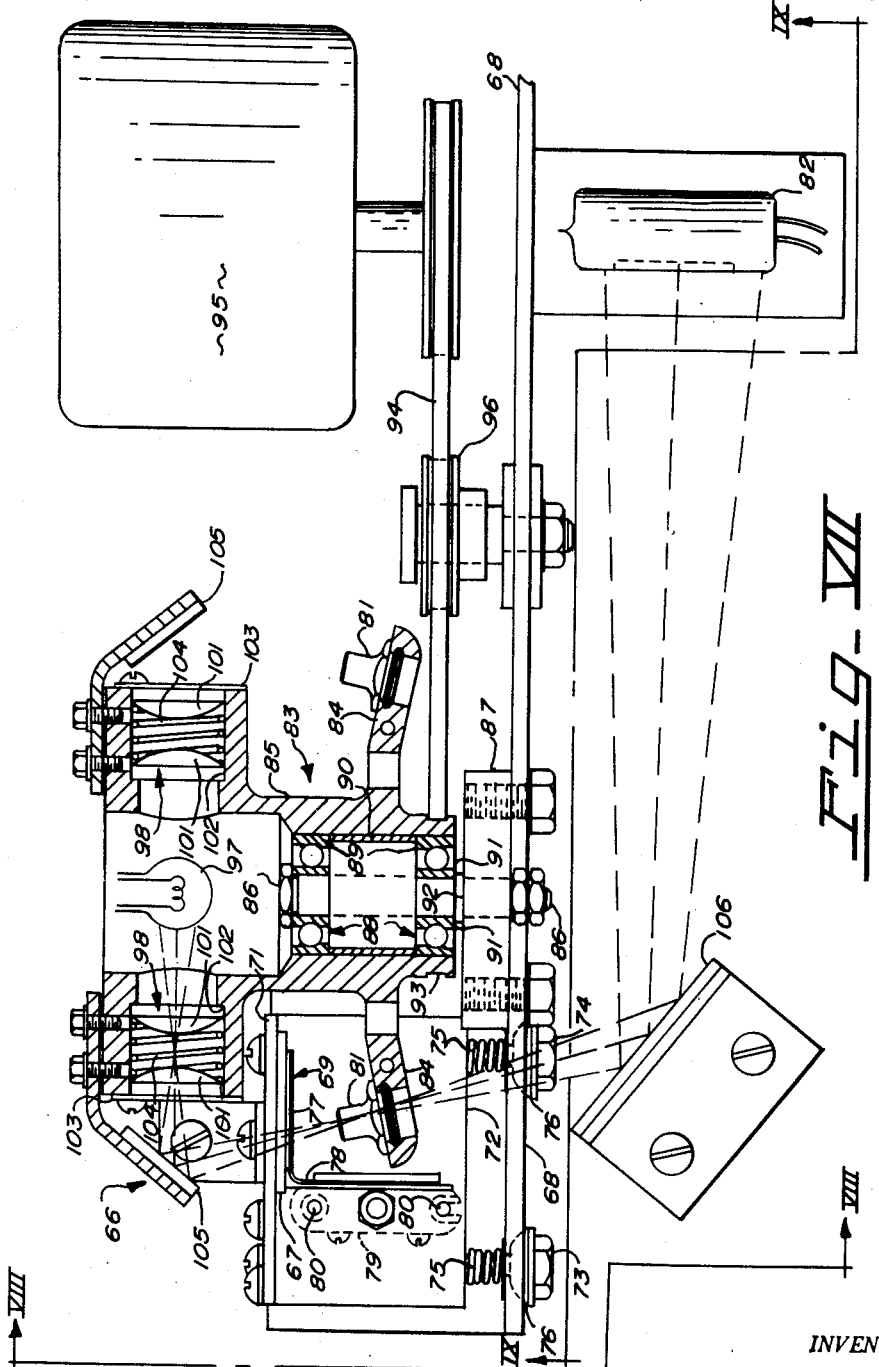

May 24, 1960
C. E. ADLER
2,938,126
INDICATOR SCANNING DEVICE
Filed Dec. 16, 1955
6 Sheets-Sheet 6
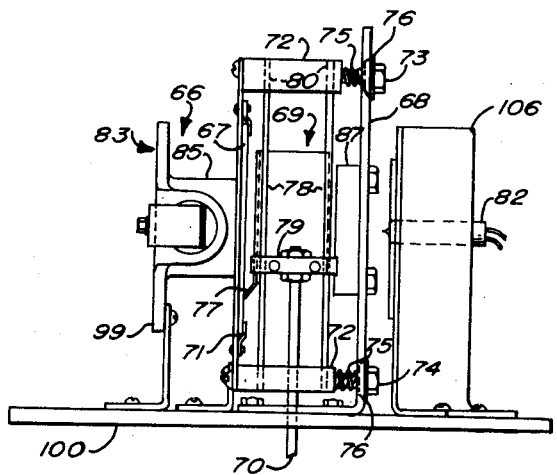
_Fig_VIII
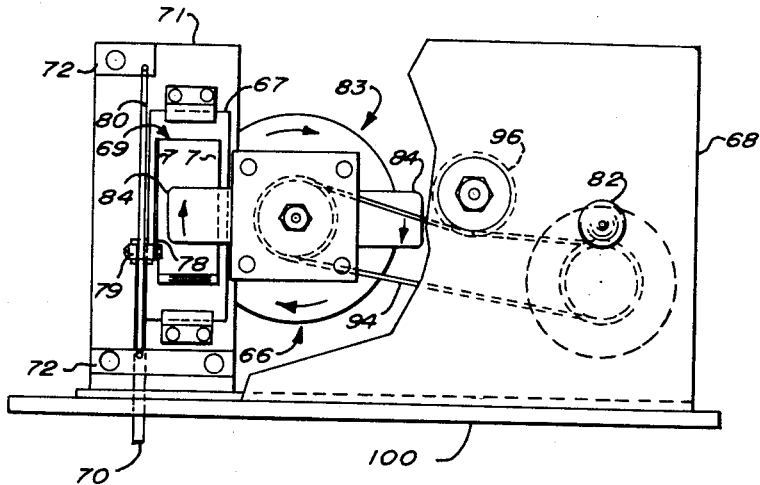
_Fig_IX
INVENTOR.
CLARENCE E. ADLER
BY
Marshall, Marshall & Geasting
ATTORNEYS

United States Patent Office

2,938,126
Patented May 24, 1960

2,938,126
INDICATOR SCANNING DEVICE

Clarence E. Adler, Toledo, Ohio, assignor, by mesne assignments, to Toledo Scale Corporation, Toledo, Ohio, a corporation of Ohio Filed Dec. 16, 1955, Ser. No. 553,457

14 Claims. (Cl. 250—219)

This invention relates to indicator scanning devices and in particular to mechanism for repeatedly and rapidly generating trains of electrical impulses in which the number of pulses in each train is proportional to an indication that is to be converted into a form suitable for use in an electronic counter.

In numerous measuring and computing applications of the type to which the scanning devices of this invention are especially applicable, information is obtained or supplied in the form of a displacement of a condition responsive member from a fixed starting position. Such a condition responsive member may be, for example, a movable part of a machine tool or an indicator of a weighing scale. In order to automatically convert such information into a form suitable for use in an electronic counter and in order that the conversion be effected repeatedly and rapidly, position sensing or indicator scanning apparatus may be provided for reading the position of the condition responsive member relative to a reference position and for generating a series of electrical impulses the number of which is proportional to the indication supplied by the condition responsive member.

The principal object of this invention is to provide an indicator scanning device which will automatically and accurately read the position of a pair of relatively movable members without creating friction or exerting any reaction force on such members.

Another object of the invention is to provide an indicator scanning device for repeatedly and rapidly generating trains of electrical impulses in which the number of pulses in each train is proportional to an indication supplied by the position of a condition responsive member, which indication is to be converted into a form suitable for use in an electronic counter.

A still further object of the invention is to provide an indicator scanning device which will automatically and accurately read the position of a pair of relatively movable members, which scanning device is simple, rugged and has a minimum of adjustments that must be maintained to keep it in working order.

More specific objects and advantages are apparent from the following description of preferred forms of the invention.

According to the invention, the indicator scanning device includes a condition responsive member, a stationary graduated chart, a photoelectric cell, an optical projection system having a lens that is movable along the chart and that is adapted to sweep projected images of chart graduations across the photoelectric cell, and a mask operatively connected to the condition responsive member and adapted to interrupt the projection of images from the chart to the photoelectric cell during a portion of the movement of the lens according to the position of the condition responsive member. Means are operatively connected to the photoelectric cell for counting during each movement of the lens the number of pulses resulting from the projected chart graduation images swept across the photoelectric cell.

The graduated chart and the path of the projection lens are fixed relative to each other to prevent relative vibration between the chart and the path and to provide easy means for focusing images of the chart on the photoelectric cell. Preventing relative vibration between the chart and the path of the projection lens adds to the accuracy of the indicator scanning device, since such relative vibration causes variations in frequency of the pulses of the wave trains and, if severe, may cause retrograde movement and consequently multiple scanning of some graduations. The provision of easy means for focusing images of the chart on the photoelectric cell also provides a system requiring a minimum of adjustments that must be carried out to maintain the focused condition.

Preferred embodiments of the invention are illustrated in the accompanying drawings.

In the drawings:

Figure I is a diagrammatic perspective view showing the indicator scanning device.

Figure II is a fragmentary schematic view showing the fixed chart and the movable mask illustrated in Figure I.

Figure III is a diagrammatic plan view of a second embodiment of the indicator scanning device.

Figure IV is a diagrammatic perspective view of a modified scanning device similar to the device shown in Figure III.

Figure V is a diagrammatic view of a modified indicator scanning device similar to the devices shown in Figures III and IV.

Figure VI is a schematic isometric view of a modified form of scanner using a reciprocating movement.

Figure VII is a plan view, partly in section, of another embodiment of the indicator scanning device.

Figure VIII is an elevational view, reduced in size, as seen from the line VIII—VIII of Figure VII looking in the direction indicated by the arrows.

Figure IX is an elevational view, reduced in size with part of the frame being broken away, as seen from the line IX—IX of Figure VII looking in the direction indicated by the arrows.

These specific figures and the accompanying description are intended merely to illustrate the invention but not to impose limitations on its scope.

Referring now to the accompanying figures, and in particular to Figure I, a basic mechanical embodiment of the features of the present invention is shown in which the condition responsive member whose position must be read is a rack 1 of a measuring instrument (not shown) mounted for movement in response to the conditions being measured by such measuring instrument. The measuring instrument might, for example, be a weighing scale the mechanism of which moves the rack 1 upwardly when a load is placed on the load receiver of the scale and which moves the rack 1 downwardly when such load is removed from the scale. Movement of the rack 1 may be used to turn a pinion 2 fixed to an ordinary weighing scale indicator shaft 3 which may be utilized in providing conventional visual indication of the weight of the load on the weighing scale.

The position of the rack 1 is indicated relative to a stationary graduated chart 4 (see also Figure II) having a plurality of transparent lines 5 corresponding to the ordinary indicia or numerals used to indicate the magnitude or degree of the conditions being measured by the instrument to which the rack 1 is attached. If the instrument is a weighing scale, there may be one transparent line 5 corresponding to each indicium on the ordinary visual indication chart of the weighing scale.

The position of the pair of relatively movable members, i.e., the rack 1 and the stationary graduated chart 4, is automatically and accurately read without creating friction or exerting any reaction force on such members by means including an optical projection system 6 having a projection lens 7 that is movable along the chart 4 so that the field of view of the lens scans the chart and that is adapted to sweep projected images of chart graduations or lines 5 across a stationary photoelectric cell 8. The path of movement of the projection lens 7 is indicated by the arrows in Figures I and II.

The rack 1 has mounted thereon a pair of spaced apart rods 9 (Figures I and II) carrying a mask 10. The mask 10 is of a length greater than the graduated portion of the chart 4 and is mounted so as to completely expose the chart when in its uppermost position. The mask 10 occludes a portion of the chart 4 according to the position of the rack 1 to which it is attached and, hence, interrupts the projection of images from the chart 4 to the photoelectric cell 8 during a portion of the movement of the projection lens 7 according to the position of the rack 1. As specifically shown in the basic mechanical embodiment illustrated in Figures I and II, the flat graduated chart 4 and straight line mask movement may be used to convert the linear position of the rack to digital information. However, a variation of the basic embodiment could convert angular position to digital information by substituting a circular chart and mask movement.

The stationary graduated chart 4 is used as a reference position against which the position of the condition responsive member or rack 1 is read. When the rack 1 is in its lowermost position in response to the condition being measured, the mask 10 just completely occludes the chart 4 and, hence, completely interrupts the projection of images of the lines 5 to the photoelectric cell 8. When the rack 1 is moved upwardly in response to the condition being measured, as shown in Figures I and II, some or all of the lines 5 are unmasked and images of the unmasked lines are swept progressively across the photoelectric cell 8. The number of images swept across the photoelectric cell 8 during each sweep of the projection lens 7 along the chart 4 is, therefore, proportional to the displacement of the mask 10 from its zero position. If the measuring instrument to which the rack 1 is attached is a weighing scale having one thousand graduations on its ordinary visual indication chart, there may be one thousand corresponding transparent lines 5 on the graduated chart 4. The number of images of the lines 5 swept across the photoelectric cell 8 during each movement of the projection lens 7 along the chart 4 would then be proportional to load on the weighing scale which moves the rack 1 and its attached mask 10 upwardly to uncover some or, if the load equals the full capacity of the scale, all of the lines 5.

The light sensitive surface of the photoelectric cell 8 is masked by a coat of paint having a slot 11 just wide enough to admit the image of one of the lines 5 focused thereon. The images may be greatly enlarged by the projection lens 7 and are preferably enlarged in the order of twenty times. Only a relatively low order of magnification is indicated in Figure I for clarity of illustration. The images of the lines 5 swept across the photoelectric cell 8 produce a series of electrical impulses which are amplified by an ordinary electronic amplifier 12 connected, by leads 13, to the photoelectric cell 8 and which impulses are counted by an ordinary electronic counter 14 connected to the amplifier. Any suitable kind of electronic or electro-mechanical means may be used for counting the amplified pulses, such means not being part of this invention. Each sweep of the projection lens 7 along the chart 4 results in a train of electrical impulses in which the number of pulses is proportional to the displacement of the mask 10 from its zero position or that position of the mask at which it just occludes all of the lines 5 on the chart 4.

The projection lens 7 is carried by a lens carrier comprising an arm 15 extending radially from a shaft 16 rotatably mounted in a frame 17, only a part of which is shown in Figure I for clarity of illustration. Suitable bearings must be provided for mounting the lens carrier shaft 16 so that it runs true without end play. The chart 4 is fixed to the frame 17 by means of bolts 18 (Figures I and II) and is therefore fixed relative to the path of movement of the projection lens 7. The graduated chart 4 and the path of movement of the projection lens 7 are fixed relative to each other to prevent relative vibration between the chart and the path and to provide easy means for accurately maintaining the focus of the lines 5 of the chart 4 on the slot 11 of the photoelectric cell 8. Preventing relative vibration between the chart 4 and the path of the projection lens 7 adds to the accuracy of the indicator scanning device, since such relative vibration causes variations in frequency of the pulses of the wave trains and, if severe, may cause retrograde movement and consequently multiple scanning of some graduations. The chart 4 being fixed to a stationary object such as the frame 17 permits the chart to be adjustably mounted so that a minimum of adjustments must be carried out to maintain a focused condition.

The lens carrier shaft 16 has its axis of rotation perpendicular to the plane of the chart 4 and carries the projection lens 7 in a path generally parallel to the plane of the chart, there being a portion of said path in proximity to the chart. Means for driving the projection lens 7 along such path includes a motor 19 turning a wheel 20 which friction drives an idler 21 friction driving in turn, a second wheel 22 fixed to the lens carrier shaft 16. A friction drive is used to couple the motor 19 to the lens carrier shaft 16 because such a drive, particularly if alternate members are rubber tired, transmits uniform motion free of gear tooth vibration or vibration of the motor shaft. The resilient rubber tires absorb the vibration and prevent any resonant vibrations in the drive system. As shown, the idler 21 is rubber tired to cooperate with metal rimmed wheels 20 and 22. Alternatively, the wheels 20 and 22 may be rubber tired to cooperate with a metal rimmed idler 21. Preferably, the motor 19 carrying wheel 20, idler 21, rotatable member 16 and the graduated chart 4 are all mounted on the frame 17.

The optical projection system 6 includes the projection lens 7, a stationary light source 23 and a stationary condensing lens 24 for illuminating the chart 4. A first mirror 25 is carried by a leg 26 extending radially from the shaft 16 and is set at an angle of approximately 45 degrees to the ray of light from the condensing lens 24. A similar mirror 27 is also carried by the leg 26 and is set at an angle of approximately 45 degrees to the reflected ray of light from the first mirror 25 and directs the ray to the portion of the chart 4 in the field of view of the projection lens 7. An image of the filament in the light source 23 is focused on the projection lens 7 and it is preferable that the ray of light passes through the projection lens 7 along its optical axis to make use of the central portion of the lens which may be more optically perfect than its marginal portion. The optical axis of the projection lens 7, shown in Figure I, is generally parallel to the axis of rotation of the lens carrier shaft 16. A second pair of mirrors 28 and 29 carried by the arm 15 of the lens carrier shaft 16 displaces the projected rays to a path generally coinciding with the axis of rotation of the lens carrier shaft 16, as indicated by the broken lines representing the rays in Figure I. As also indicated by such broken lines, the ray of reflected light from the mirror 27 sweeps through the transparent lines 5 on the chart 4, passes between the spaced apart rods 9 and then is directed to the projection lens 7. However, the rods 9 and the mask 10 may be positioned on the other side of the chart 4 to interrupt the projection of images of the lines 5 to the photoelectric cell 8.

It may be desirable to include two or more projection lenses in the optical system 6 to provide multiple scans of the chart 4 per single revolution of the lens carrier.

A second embodiment of the indicator scanning device is shown in Figure III. The scanning device includes a plurality of projection lenses and has a photoelectric cell located in an extension of the position of the optical axes of the projection lenses when scanning the center of the graduated chart. This embodiment of the indicator scanning device is of very simple and compact design having a minimum of mirrors in its optical system.

This indicator scanning device shown in Figure III is basically similar to the device hereinbefore described and shown in Figures I and II. The position of a pair of relatively movable members is automatically determined by means including an optical projection system 6a. One of the relatively movable members, a graduated chart 4a, is fixed to a frame 17a. The other of the relatively movable members, a mask 10a, is carried by a condition responsive member which may be a rack like the rack 1 shown in Figure I and hereinbefore described. The mask 10a functions to occlude a portion of the chart 4a, which has a plurality of transparent lines similar to the lines 5 shown in Figure I, according to the displacement of the condition responsive member from a fixed starting position.

A pair of projection lenses 7a are carried by a lens carrier comprising an arm 15a extending radially from a shaft 16a rotatably mounted on the frame 17a. Suitable bearings are provided for mounting the lens carrier shaft 16a so that it runs true. Since the chart 4a and the lens carrier shaft 16a are mounted on the common frame 17a, the chart and the path of movement of the projection lenses 7a are fixed relative to each other.

The lens carrier shaft 16a has its axis of rotation perpendicular to the plane of the chart 4a and carries the projection lenses 7a in a path generally parallel to the plane of the chart, there being a portion of said path in proximity to the chart. A friction drive similar to that shown in Figure I and including a wheel 22a drives the lens carrier shaft 16a.

The optical projection system 6a includes the projection lenses 7a, a stationary light source 23a and a stationary condensing lens 24a for illuminating the chart 4a. A 90 degree prism mirror 30 having several reflecting surfaces 31 is carried by the lens carrier shaft 16a on its axis of rotation and divides the ray of light coming from the condensing lens 24a into several rays the principal one of which is indicated at 32. The light source 23a and the condensing lens 24a are offset from the axis of rotation of the lens carrier shaft 16a so that when the lens carrier is turned 180 degrees from its position shown in Figure III the principal ray 32 is still directed in the pattern shown in Figure III.

When the lens carrier shaft 16a is in the position shown in Figure III, one of a pair of mirrors 33 carried one at each end of legs 26a extending radially from the shaft 16a is located at an angle of approximately 45 degrees to the reflected principal ray 32. When the lens carrier shaft 16a is turned 180 degrees, the other of the other of the mirrors 33 is similarly located. The principal ray 32 is directed by one or the other of the mirrors 33 to the portion of the chart 4a in the field of view of one or the other of the projection lenses 7a.

The filament in the light source 23a is focused on the projection lenses 7a and it is preferable that the rays of light pass through the projection lenses 7a along their optical axes. The optical axes of the projection lenses 7a, shown in Figure III, are generally parallel to the axis of rotation of the lens carrier shaft 16a.

When the lens carrier shaft 16a is rotated, the field of view of first one and then the other of the projection lenses 7a scans the graduated chart 4a and the lenses sweep projected images of the exposed chart graduations across a stationary photoelectric cell 8a located in an extension of the position of the optical axes of the projection lenses 7a when scanning the center of the chart 4a. The images of the chart graduations swept across the photoelectric cell 8a produce a series of electrical impulses which are amplified by an ordinary electronic amplifier 12a connected, by means of leads 13a, to the photoelectric cell 8a and which impulses are counted by an ordinary electronic counter 14a connected in turn to the amplifier. The movement of the projection lenses 7a along the chart 4a repeatedly and very rapidly causes trains of electrical impulses to be generated in which the number of pulses in each train is proportional to the travel of the mask 10a from its zero position or that position of the mask when it just occludes all of the graduations of the chart 4a.

Just before the field of view of each of the lenses 7a begins its traverse of the graduated chart 4a, one or the other of a pair of cams 34 carried by the arm 15a of the lens carrier closes the contacts of a switch 35 connected, by leads 36, to the counter 14a to cause the counter to reset. Immediately after the traverse of the chart 4a has been finished, that one of the cams 34 which closed the contacts of the switch 35 closes contacts of a switch 37 connected, by leads 38, to the counter 14a conditioning the counter for a "read out." The contacts of the switches 35 and 37 are of a type which spring open after the cams 34 pass by. Similar switches and cams may be used for controlling the resetting and reading of the counter 14 shown in Figure I.

It is not necessary that the photoelectric cell 8a be located in a direct extension of the optical axes of the projection lenses 7a. In fact, in order to have a more compact structure, it may be desirable to mount the photoelectric cell 8a on the frame 17a and fold, by reflection, the path of the projected rays to compensate for the altered position. Such an arrangement is illustrated in Figure IV showing a modified scanning device very similar to the device shown in Figure III and basically similar to the device shown in Figures I and II.

Referring to Figure IV, like reference numerals, except an addition of the letter "b" to each, identify parts of the indicator scanning device which are the same in structure and in function as similar parts shown in Figure III. The only differences between the device shown in Figure IV and the device shown in Figure III are that the tips 39 (Figure IV) of an arm 15b are bent to direct the optical axes of the projection lenses 7b generally toward the axis of rotation of a lens carrier shaft 16b and the mirrors 33b are located so as to direct the rays of light through the projection lenses 7b along their optical axes. A photoelectric cell 8b is mounted in a position off the direct extension of the optical axes of the projection lenses 7b when they sweep past the chart 4b. A stationary mirror 40 is provided for reflecting the projected rays to a slot 11b in a coating on the outer surface of the photoelectric cell 8b.

It is not necessary that the photoelectric cell 8b be located in a position off the direct extension of the optical axes of the projection lenses when they sweep past the chart 4b. A modified scanning device very similar to the devices shown in Figures III and IV and basically similar to the device shown in Figures I and II is illustrated in Figure V.

Referring to Figure V, like reference numerals, with the addition of a "c" to each, identify parts of the indicator scanning device which are the same in structure and in function as similar parts shown in Figure IV. The only difference between the device shown in Figure V and the device shown in Figure IV is that a photoelectric cell 8c (Figure V) is located near or at the intersection of the lens carrier shaft 16c and the optical axes of the projection lenses.

In the embodiments of the invention illustrated in

Figures I to V inclusive, the projection lens or lenses were mounted in or on a continuously rotated member so as to follow a circular path having a portion parallel to and adjacent the stationary graduated chart. While such an arrangement is preferable in some cases similar results may be obtained by moving the lens back and forth along a path parallel to and adjacent the chart. Such a path may be either straight or curved depending upon the structure selected to support and guide the lens and associated equipment. An arrangement in which the projection lens moves back and forth is illustrated in Figure VI.

This figure illustrates a portion of the weighing mechanism and the optical equipment suitable for use in a compact counter top scale. As shown in this figure a load receiver 40 is pivotally supported on an H-shaped main lever 41 which in turn is fulcrumed on fulcrum stands 42 mounted from a base not shown in the drawings. Downwardly projecting arms 43 of the main lever 41 are preferably attached to load counterbalancing springs, also not shown in the drawings. Other structure not shown but required in an actual scale includes check link mechanism arranged to hold the load receiver 40 in upright position, and a dash pot or some equivalent damping means for suppressing continued oscillation of the lever system following abrupt changes in loading of the scale.

An indicator drive frame 44 is pivotally supported on the free ends of the side members of the H-shaped main lever 41 and is guided by a pair of check links 45 connected by means of flexure plates 46 and 47 to the indicator drive frame 44 and the fulcrum standards 42 respectively.

The load counterbalancing springs attached to the lever are designed so that the indicator frame 44 moves downwardly through equal increments of distance for equal increments of load applied to the load receiver 40. If desired, optical or mechanical indicating equipment may be operatively attached to the indicator drive frame 44 to provide visual indication of the magnitude of the load on the load receiver 40.

The position of the indicator drive frame 44 is also indicated or read photoelectrically by a reciprocating scanning device including a lever 50, one end of which is bifurcated to embrace a U-shaped support bracket or pedestal 51 mounted from the base of the scale. The lever 50 is pivotally mounted on an axle 52 mounted in the support bracket 51.

The lever 50 is oscillated or driven by a crank 53 and connecting rod 54, the crank 53 being mounted on the output shaft of a motor 55. The motor 55 is preferably mounted on a motor stand 56 mounted on the base of the scale.

The length of the crank 53 is selected so that the free end of the lever 50 carrying a light source 57, a condensing lens 58, a projection lens 59, and a reflector 60 moves through a distance that is approximately 30 percent greater than the full scale travel of the indicating frame 44. A chart 61 rigidly mounted from the base of the scale, so as to remain stationary at all times, is provided with alternate opaque and transparent lines 62 located in the path of the light beam from the source 57 to the projection lens 59. An opaque mask 63 mounted on the indicator frame 44 cooperates with the stationary chart 61 so as to expose to the light beam a number of transparent lines according to the position of the indicator frame 44. Thus with no load on the load receiver 40 the mask 63 just covers or occludes all of the lined portion of the chart 61. As the load on the scale is increased the indicator frame 44 moves downwardly thus carrying the mask 63 downwardly to expose more and more of the transparent lines 62. Light passing through the exposed and transparent lines of the stationary chart 61 is focused by the projection lens 59 and reflectors 60 and 64 to form enlarged images of the lines at a photoelectric cell 65. The photoelectric cell 65 is masked so as to receive the image of a single line at time.

The reflectors 60 and 64 are both mounted on the reciprocating lever 50 so as to direct the light from the projection lens 59 to the photoelectric cell 65 and also keep the images of the transparent lines 62 properly aligned with the mask on the photocell 65. The reflector 64 is mounted in line with the axle 52 on which the lever 50 fulcrums so that the reflected optical axis of the lens system is always directed at the photoelectric cell.

The length of the crank arm 53, as has been mentioned, is of such length that the movement of the free end of the lever 50 exceeds by approximately 30 to 40 percent the length of the graduated portion of the stationary chart 61. The overtravel is generally equally divided at the ends of the stroke so that the optical path scans the chart 61 at an approximately uniform rate.

Synchronizing switches, similar to the switches 35 and 37 of Figure III, may be included and operated by the lever 50 or by the crank 53. The circuit may be arranged so as to count the number of exposed chart graduations on both the downward and upward strokes of the lever 50 or it may be arranged so as to count during one direction of scan only.

This reciprocating arrangement offers the advantage that it may be constructed to mount in smaller space than the rotating equipment illustrated in the preceding drawings. Likewise, less complexity is encountered and better optical efficiency obtained by carrying the light source and condensing lens directly on the lever 50 as so to always maintain precise dimensional relation in the optical system. Toward this end it should also be noted that the lever 50 and particularly the bearings on the axle 52 must be constructed to eliminate any end play which would vary the distance from the projection lens 59 to the stationary chart 61. Variations in this dimension would of course impair the sharpness of focus of optical system and if severe enough might result in substantially continuous illumination of the photoelectric cell 65 thus losing the ability to read the number of exposed graduations.

While the equipment has been shown with the lever 50 as a means of mounting and moving the light source and projection lens, it should be noted that other mechanical guiding and driving methods could accomplish the same results. Any means capable of driving the projection lens and light source along a path parallel to the stationary chart 61 and at a fixed distance therefrom would satisfactorily supply the requirements of the optical system.

Another embodiment of the indicator scanning device is shown in Figures VII–IX which is basically similar to the devices hereinbefore described and shown in Figures I–VI. This embodiment of the device is very compact and is a good design for production purposes, the lens carrier comprising a small, compact and easily manufactured body member. The position of a pair of relatively movable members is automatically determined by means including an optical projection system 66. One of the relatively movable members, a graduated chart 67, is adjustably fixed, for focusing purposes, to a frame 68. The other of the relatively movable members, a mask 69, is carried atop a rod 70 carried in turn by a condition responsive member which may be a rack like the rack 1 shown in Figure I and hereinbefore described. The mask 69 functions to occlude a portion of the chart 67, which has a plurality of transparent lines similar to the lines 5 shown in Figure I, according to the displacement of the condition responsive member from a fixed starting position.

The chart 67 is clipped to a plate 71 which is fixed at its top and bottom to horizontal bars 72 the upper one of which is attached to the frame 68 by means of one set screw 73 and the lower one of which is attached to the frame 68 by means of a pair of set screws 74. Springs 75, surrounding the screws 73 and 74, urge the bars 72 away from the frame 68 and cup-shaped washers 76 separate the heads of the screws 73 and 74 from the frame 68. The screws 73 and 74 together with the springs 75 and the cup-shaped washers 76 provide, in space, a three-point adjustable mounting for the chart 67 so that a minimum of adjustments must be carried out to maintain a focused condition without causing cracking of the chart which may be made of glass.

The mask 69 includes an obstructing wing 77 movable in a path at least a portion of which is closely adjacent and parallel to the graduated chart 67 and a connecting wing 78 that extends at right angles to the wing 77 and that is attached to a slider 79 fixed atop the rod 70. Stationary guide rods 80, extending between the bars 72, cooperate with the slider 79 and guide it vertically up and down when the slider is driven by the rod 70 that is driven in turn by the condition responsive member. The stationary graduated chart 67 is used as a reference against which the position of the condition responsive member is read. When the member carries the rod 70 to its lowermost position, the obstructing wing 77 of the mask 69 just completely occludes the graduated portion of the chart 67. When the rod 70 is moved upwardly in response to the condition being measured, some or all of the lines on the chart are unmasked.

The optical projection system 66 includes a pair of projection lenses 81 which are movable along the chart 67 so that the fields of view of the lenses scan the chart and that are adapted to sweep projected images of chart graduations across a stationary photoelectric cell 82 fixed to the frame 68. The path of movement of the projection lenses 81 is indicated by the arrows in Figure IX. The pair of projection lenses 81 are carried by and adjustably mounted for focusing purposes on a lens carrier 83 comprising arms 84 extending radially from a body member 85 rotatably mounted on the frame 68. Since the chart 67 and the lens carrier 83 are mounted on the common frame 68, the chart and the path of movement of the projection lenses 81 are fixed relative to each other.

The lens carrier 83 is generally symmetrical about the axis of a bolt 86 (Figure VII) fixed to a block 87 attached to the frame 68 and has its axis of rotation perpendicular to the plane of the chart 67 and carries the projection lenses 81 in a path generally parallel to the plane of the chart, there being a portion of the path in proximity to the chart. The body member 85 is generally hollow and may be made of aluminum by a sand casting process. Suitable bearings 88 are provided for mounting the body member 85 so that it runs true without end play and include outer races 89 spaced apart by means of a sleeve 90, pinned within the body member 85, and inner races 91 mounted on the bolt 86. A washer 92, resiliently pressed against that one of the inner races 91 remotely located relative to the head of the bolt 86, urges the bearings 88 toward the head of the bolt and, thus, prevents end play.

One end of the body member 85 of the lens carrier 83 is grooved at 93 to retain a drive belt 94 which couples a motor 95 to the carrier. The drive belt 94 is suitably tensioned by means of an idler 96 and drives the projection lenses 81 along their hereinbefore mentioned path. Preferably, as illustrated, the motor 95, idler 96, lens carrier 83, graduated chart 67, and stationary photoelectric cell 82 are all mounted on the frame 68.

The optical projection system in addition to the projection lenses 81 includes a stationary light source 97 and a pair of condensing lenses 98, carried within and by the generally hollow rotatable body member 85 of the lens carrier 83, for illuminating the chart 67. The stationary light source 97 is enveloped by the generally hollow body member 85 and is carried by a bracket 99 fixed to a base 100 to which is also fixed the frame 68. A feature of the lens carrier 83 is the way in which the condensing lenses 98 may be mounted in the body member 85 of the carrier. The condensing lenses 98 each comprise two separate members 101 the plane surfaces of which must be correctly spaced apart to obtain a suitable condensing effect. However, the members 101 may be of slightly varying thicknesses as purchased. To accommodate members 101 of varying thicknesses, one of the members 101 is retained in a seat 102 in the body 85, the other is positioned against a ring 103 fixed to the body 85, and a spiral spring 104 is provided to urge the members 101 apart so that the plane surfaces of each of the condensing lenses 98 are always correctly spaced.

Mirrors 105, carried by the body member 85 of the lens carrier 83 adjacent and at angles to the optical axes of the condensing lenses 98, direct the rays of light from the lenses 98 through the chart 67 and through the projection lenses 81 along the optical axes of the lenses 81 which axes are directed along the slant height of a cone generally toward the axis of rotation of the lens carrier 83. An image of the filament in the light source 97 is focused on the projection lenses 81 which project images of the graduations on the chart 67 from the chart to the photoelectric cell 82 during a portion of their movement. A stationary mirror 106, attached to the base 100, displaces the projected rays to a path that is at right angles to the axis of rotation of the lens carrier 83 directing the projected rays to the photoelectric cell 82. The projected rays from the stationary mirror 106 pass along a path which is generally parallel to the base 100. The images of the chart graduations swept across the photoelectric cell 82 produce a series of electrical impulses which are amplified by an ordinary amplifier connected to the photoelectric cell and which are counted by an ordinary electronic counter connected to the amplifier, the amplifier and the counter being connected to the photoelectric cell as shown in Figures I and III. Synchronizing switches, similar to the switches 35 and 37 of Figure III, may be included.

In each of the various embodiments of the invention a graduated chart, preferably having transparent graduations, is fixedly mounted alongside the path of a movable portion of a condition responsive member. A portion of the condition responsive member forms a mask to occlude more or less of the chart, according to the position of the condition responsive member. While it is preferable, as previously mentioned, to fix the chart and move the mask, these parts may be reversed and the system will still function.

The exposed graduations are counted by an electronic counter responsive to a photoelectric system having a projection lens and light directing means movable to scan the exposed chart graduations. It is desirable, for maximum definition in the projected images, that the optical axis of the projection lens at all points of a scan be directed at the photoelectric cell. Figures I, IV, and V, VI, VII, VIII, and IX show structure accomplishing this. In Figures I and VI the optical axis of the projection lens is parallel to the axis of rotation of the lens carrier and, by multiple reflection, is brought into alignment with the axis of rotation before reaching the photoelectric cell. In Figures IV, V, VII, VIII, and IX the optical axis of each lens extends along the slant height of a cone having its apex on the axis of rotation. The photoelectric cell is located at the apex of such cone. Figures IV, VII, VIII, and IX illustrate deflection of the rays for the sake of physical compactness without altering the optical principle.

It is not necessary that the projected optical axis of the lens system always strike the photoelectric cell. By using projected images off the optical axis greater freedom in locating the photoelectric cell is obtained. One such location is indicated in Figure III where the projected optical axis is generally parallel to the axis of rotation and the photoelecteric cell successively receives images from different parts of the field of view as the lens scans the chart, These various arrangements of scanning mechanism provide reliable electrical pulse trains indicative of the position of the condition responsive member.

The embodiments of the invention herein shown and described are to be regarded as illustrative only and it is to be understood that the invention is susceptible to variation, modification, and change within the spirit and scope of the subjoined claims.

This application is a continuation-in-part of application Serial No. 527,711 filed August 11, 1955 and now abandoned.

Having described the invention, I claim:

1. An indicator scanning device comprising, in combination, a condition responsive member, a stationary graduated chart, a photoelectric cell, an optical projection system having a lens that is movable along the chart in an arcuate path and that is adapted to sweep projected images of chart graduations across the photoelectric cell, a mask operatively connected to the condition responsive member and adapted to interrupt the projection of images from the chart to the photoelectric cell during a portion of the movement of the lens according to the position of the condition responsive member, and means operatively connected to the photoelectric cell for counting during each movement of the lens the number of pulses resulting from the projected chart graduation images swept across the photoelectric cell.

2. An indicator scanning device comprising, in combination, a frame, a condition responsive member, a stationary graduated chart fixed to the frame, a stationary photoelectric cell, an optical projection system having a lens that is movable along a path which is fixed relative to the frame to prevent relative vibration between the chart and the path and that is adapted to sweep projected images of chart graduations across the photoelectric cell, means for driving the lens along said path, and a mask operatively connected to the condition responsive member and adapted to interrupt the projection of images from the chart to the photoelectric cell during a portion of the movement of the lens according to the position of the condition responsive member.

3. An indicator scanning device comprising, in combination, a fixedly located graduated chart, a stationary photoelectric cell, a projection lens arranged with a portion of the chart within its field of view and adapted to project images of graduations of the chart within said field of view onto the photoelectric cell, means for moving the lens such that said field of view scans the chart, a condition responsive member, a mask operatively connected to the condition responsive member and adapted to interrupt the projection of images from the chart to the photoelectric cell during a portion of the movement of the lens according to the position of the condition responsive member, and means for preventing the photoelectric cell from accepting more than one projected image at a time.

4. An indicator scanning device comprising, in combination, a condition responsive member, a stationary chart having graduations in the form of parallel lines, a photoelectric cell, an optical system having a projection lens that is movable along the chart in an arcuate scanning path and that is adapted to sweep projected images of chart graduations across the photoelectric cell, a mask that is movable in a straight line path operatively connected to the condition responsive member and adapted to interrupt the projection of images from the chart to the photoelectric cell during movement of the projection lens according to the position of the condition responsive member and means for preventing the photoelectric cell from accepting more than one projected image at a time.

5. An indicator scanning device comprising, in combination, a condition responsive member, a stationary chart having graduations in the form of parallel lines, a stationary photoelectric cell, an optical system having a projection lens that is movable along the chart in an arcuate scanning path and that is adapted to sweep projected images of chart graduations across the photoelectric cell, a stationary mask for the photoelectric cell having a slit just wide enough to admit to the photoelectric cell the image of one of the graduations focused thereon, and a movable mask operatively connected to the condition responsive member and adapted to interrupt the projection of images from the chart to the photoelectric cell during movement of the projection lens according to the position of the condition responsive member.

6. An indicator scanning device comprising, in combination, a frame, a stationary graduated chart fixed to the frame, a stationary photoelectric cell, a generally hollow carrier rotatably mounted on the frame, a light source enveloped by the generally hollow carrier, an optical system carried by the carrier having a projection lens that is supplied with light from the light source and that is movable along the chart in an arcuate scanning path and that is adapted to sweep projected images of chart graduations across the photoelectric cell, means for moving the carrier, and a mask operatively connected to the condition responsive member and adapted to interrupt the projection of images from the chart to the photoelectric cell according to the position of the condition responsive member.

7. An indicator scanning device comprising, in combination, a frame, a stationary chart that is fixed to the frame and that has graduations in the form of parallel lines, a stationary photoelectric cell, a generally hollow carrier movably mounted on the frame, a light source enveloped by the generally hollow carrier, an optical system carried by the carrier having a projection lens that is supplied with light from the light source and that is movable along the chart in an arcuate scanning path and that is adapted to sweep projected images of chart graduations across the photoelectric cell, a stationary mask for the photoelectric cell having a slit just wide enough to admit the image of one of the parallel lines focused thereon, means for moving the carrier, and a mask operatively connected to the condition responsive member and adapted to interrupt the projection of images from the chart to the photoelectric cell according to the position of the condition responsive member.

8. An indicator scanning device comprising, in combination, a condition responsive member, a stationary chart having graduations in the form of parallel lines, a stationary photoelectric cell, a stationary light source, a lens carrier that is rotatably mounted and that has a hollow portion enveloping the light source, an optical system carried by the lens carrier having a projection lens that is supplied with light from the light source and that is movable along the chart in an arcuate scanning path and that is adapted to sweep projected images of chart graduations across the photoelectric cell, a stationary mask for the photoelectric cell having a slit just wide enough to admit the image of one of the parallel lines focused thereon, means for driving the lens carrier, and a mask that is movable in a straight line path operatively connected to the condition responsive member and adapted to interrupt the projection of images from the chart to the photoelectric cell during movement of the projection lens according to the position of the condition responsive member.

9. A scanner comprising, in combination, a stationary graduated chart, a stationary photoelectric cell, a movably mounted projection lens arranged to view the chart and adapted to project images of chart graduations onto the photoelectric cell, means for moving the lens in a path adjacent the chart, a condition responsive member, a mask operatively connected to the condition responsive membr and adapted to interrupt the projection of images from the chart to the photoelectric cell according to the position of the condition responsive member, and means for preventing the photoelectric cell from accepting more than one projected image at a time.

10. A scanner according to claim 9 wherein the projection lens is rotated in a circular path a portion of which is adjacent the chart.

11. A scanner according to claim 9 wherein the projection lens is reciprocated in a curved path adjacent the chart.

12. An indicator scanning device according to claim 10 in which the optical axis of the projection lens is generally parallel to its axis of rotation.

13. An indicator scanning device according to claim 10 in which the optical axis of the projection lens is directed generally toward its axis of rotation.

14. An indicator scanning device according to claim 10 in which the optical axis of the projection lens is generally parallel to its axis of rotation, and reflecting means are provided for displacing the projected rays to a path generally coinciding with the axis of rotation.

References Cited in the file of this patent

UNITED STATES PATENTS

| | | |
|---|---|---|
| 1,648,058 | Parker | Nov. 8, 1927 |
| 2,088,297 | Koenig | July 27, 1937 |
| 2,193,606 | Ulrey | Mar. 12, 1940 |
| 2,375,665 | Koulicovitch I | May 8, 1945 |
| 2,376,234 | DeCastro | May 15, 1945 |
| 2,393,631 | Harrison et al. | Jan. 29, 1946 |
| 2,397,971 | Martinec | Apr. 9, 1946 |
| 2,406,299 | Koulicovitch II | Aug. 20, 1946 |
| 2,596,752 | Williams | May 13, 1952 |
| 2,605,695 | Campbell | Aug. 5, 1952 |
| 2,720,810 | Senn | Oct. 18, 1955 |
| 2,769,922 | Peery | Nov. 6, 1956 |
| 2,878,710 | Willey | Mar. 24, 1959 |